(12) United States Patent
Lee et al.

(10) Patent No.: US 12,157,429 B1
(45) Date of Patent: Dec. 3, 2024

(54) AIRBAG CUSHION INCLUDING A PUSHER CHAMBER

(71) Applicant: GM GLOBAL TECHNOLOGY OPERATIONS LLC, Detroit, MI (US)

(72) Inventors: Changhan Lee, Incheon (KR); Junbum Lee, Gwangmyeong-si (KR)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/663,023

(22) Filed: May 13, 2024

(51) Int. Cl.
*B60R 21/2334* (2011.01)
*B60R 21/231* (2011.01)

(52) U.S. Cl.
CPC .... *B60R 21/2334* (2013.01); *B60R 21/23138* (2013.01)

(58) Field of Classification Search
CPC .......... B60R 21/2334; B60R 21/23138; B60R 21/213; B60R 21/21; B60R 21/232
See application file for complete search history.

(56) References Cited

U.S. PATENT DOCUMENTS 11,400,879 B2 * 8/2022 Kang ................. B60N 2/42727
11,667,258 B1 * 6/2023 Golman ................. B60R 21/214
280/728.1

FOREIGN PATENT DOCUMENTS

| CN | 118354938 | A | * | 7/2004 | |
| CN | 117429381 | A | * | 1/2024 | ............ B60R 11/00 |
| KR | 200410291 | Y1 | * | 3/2006 | |

* cited by examiner

*Primary Examiner* — Faye M Fleming
(74) *Attorney, Agent, or Firm* — Lorenz & Kopf LLP (57) ABSTRACT

An active vehicle restraint system an airbag inflator configured to expel an inflator gas in response to an airbag trigger control signal, an airbag cushion having a pusher chamber wherein the airbag cushion is configured such that the inflator gas is directed towards the pusher chamber such that the pusher chamber is pressurized before a remainder of an airbag cushion chamber, a vehicle trim piece affixed to a vehicle body with a retention element such that the vehicle trim piece covers a portion of the airbag cushion, wherein the retention element is configured such that the retention element is detached from the vehicle body by the pusher chamber and wherein the retention element maintains a structural integrity during a detachment process from the vehicle body, and an electronic control unit for generating the airbag trigger control signal in response to the sensor control signal.

20 Claims, 6 Drawing Sheets

AIRBAG CUSHION INCLUDING A PUSHER CHAMBER

INTRODUCTION

The present disclosure relates to vehicle occupant restraint systems including deployable airbag systems. More specifically, aspects of this disclosure relate to systems, methods and devices to enable safe deployment of concealed airbag systems by employing seams and pusher chambers to route inflation gases in order to disengage retention clips and cabin interior trim before full deployment of the inflation cushion.

Airbag assemblies typically include an airbag cushion and an inflator that is operable to inflate the airbag cushion. The inflator includes a tube having a closed end containing a gas source and an open end opposite the closed end and positioned within the airbag cushion. The gas source typically includes an electric igniter and at least one of an explosive charge such as a solid propellant and a stored gas charge stored under high pressure. The electric igniter ignites the solid propellant and/or releases the stored gas in response to an electronic control signal, which produces a gas that inflates the airbag cushion. Airbag assemblies are often mounted in a dashboard of a vehicle, in a seat of a vehicle and/or in a steering wheel of a vehicle. Some airbag assemblies are mounted to a roof of a vehicle and/or roof pillars of a vehicle and inflate in a downward manner toward the occupants in the vehicle. Such airbag assemblies are commonly referred to as roof-mounted or rood rail airbag systems.

The current design of airbag modules employing interior trim covers raises concerns regarding potential safety hazards during deployment. These plastic trims, while aesthetically pleasing and potentially improving initial cabin presentation, could introduce reliability issues upon airbag activation. The plastic material's reaction to the forceful and rapid inflation of the airbag is unpredictable. In the worst-case scenario, the plastic trim could delay or hinder airbag deployment, or worse, fragment upon impact creating additional projectiles within the cabin risking further occupant injury. This design feature introduces a new variable into the airbag deployment sequence, potentially compromising a well-established safety system.

Accordingly, it would be desirable to provide systems, methods and mechanisms to safely deploy vehicle airbags without creating additional projectiles within the vehicle cabin. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are active vehicle safety systems and methods and related control logic for provisioning active vehicle safety systems, methods for making and methods for operating such systems, and motor vehicles equipped with such systems. By way of example, and not limitation, there are presented various embodiments of systems for providing a pillar pusher chamber to disengage trim fasteners during the initial stages of airbag deployment in a motor vehicle active safety system disclosed herein.

In accordance with an aspect of the present disclosure, an active vehicle restraint system including a sensor for generating a sensor control signal in response to an acceleration, an airbag inflator configured to expel an inflator gas in response to an airbag trigger control signal, an airbag cushion having a pusher chamber wherein the airbag cushion is configured such that the inflator gas is directed towards the pusher chamber such that the pusher chamber is pressurized before a remainder of an airbag cushion chamber, a vehicle trim piece affixed to a vehicle body with a retention element such that the vehicle trim piece covers a portion of the airbag cushion, wherein the retention element is configured such that the retention element is detached from the vehicle body by the pusher chamber and wherein the retention element maintains a structural integrity during a detachment process from the vehicle body, and an electronic control unit for generating the airbag trigger control signal in response to the sensor control signal.

In accordance with another aspect of the present disclosure wherein the pusher chamber is a portion of the airbag cushion chamber.

In accordance with another aspect of the present disclosure wherein the inflator gas is directed towards the pusher chamber by at least one seam within the airbag cushion.

In accordance with another aspect of the present disclosure wherein the inflator gas is directed towards the pusher chamber by a circular button sewn into the airbag cushion and wherein the circular button is further configured to accept a bolt for securing the airbag cushion to the vehicle body.

In accordance with another aspect of the present disclosure wherein the airbag cushion is a roof rail airbag cushion and the vehicle trim piece is a pillar trim piece.

In accordance with another aspect of the present disclosure wherein the retention element is a press fit clip pressed over an edge of a mounting tab rigidly affixed to the vehicle body within a vehicle cabin.

In accordance with another aspect of the present disclosure wherein the airbag cushion is a roof rail airbag.

In accordance with another aspect of the present disclosure wherein the vehicle trim piece is a pillar trim piece and wherein the retention element is a detachable c-clip engaged on a tab rigidly affixed to the vehicle body.

In accordance with another aspect of the present disclosure wherein the retention element is a spade type clip inserted first through a grommet in the pusher chamber and then through a hole in a tab rigidly affixed to the vehicle body.

In accordance with another aspect of the present disclosure, a method of implementing an active vehicle restraint system including generating, by an electronic control unit, an airbag trigger control signal in response to receiving a sensor signal indicative of an acceleration of a vehicle body exceeding a threshold acceleration, expelling an inflator gas by an airbag inflator into an airbag cushion in response to the airbag trigger control signal, and directing the inflator gas to a pusher chamber integrated within the airbag cushion such that the pusher chamber is pressurized before a remainder of the airbag cushion and wherein a pressurization of the pusher chamber causes a retention element of a vehicle trim piece to be detached from the vehicle body by the pusher chamber and wherein the retention element maintains a structural integrity during a detachment process from the vehicle body.

In accordance with another aspect of the present disclosure wherein the pusher chamber forms a portion of an airbag cushion chamber.

In accordance with another aspect of the present disclosure wherein the inflator gas is directed towards the pusher chamber by a seam sewn into the airbag cushion.

In accordance with another aspect of the present disclosure wherein the inflator gas is directed towards the pusher chamber by a circular button sewn into the airbag cushion and wherein the circular button is further configured to accept a retention bolt to be secured within a threaded hole rigidly affixed to the vehicle body.

In accordance with another aspect of the present disclosure wherein the airbag cushion is a roof rail cushion and the vehicle trim piece is a pillar trim piece.

In accordance with another aspect of the present disclosure wherein the retention element is a detachable c-clip engaged on a tab welded to the vehicle body.

In accordance with another aspect of the present disclosure wherein the retention element is a press fit clip pressed over an edge of a mounting tab rigidly affixed to the vehicle body within a vehicle cabin.

In accordance with another aspect of the present disclosure wherein the airbag cushion is a side curtain airbag and the vehicle trim piece is a roof rail trim piece.

In accordance with another aspect of the present disclosure wherein the retention element is a spade type clip inserted first through a grommet in the pusher chamber and then through a hole in a tab rigidly affixed to the vehicle body.

In accordance with another aspect of the present disclosure, an airbag cushion including an inlet for receiving a compressed gas from an airbag inflator, wherein the airbag inflator is triggered in response to an acceleration exceeding a threshold acceleration, a pusher chamber configured such that the compressed gas is initially directed towards the pusher chamber such that the pusher chamber is pressurized before a remainder of the airbag cushion and wherein the pusher chamber is configured to disengage an interior trim piece retention element from a vehicle body frame member when the pusher chamber is pressurized such that the interior trim piece retention element maintains a structural integrity during a detachment process from a vehicle body.

In accordance with another aspect of the present disclosure wherein the airbag cushion further includes at least one of a seam and a button sewn into the airbag cushion to direct the compressed gas from the inlet to the pusher chamber such that the pusher chamber is pressurized before the remainder of the airbag cushion.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Existing airbag assemblies are often mounted in dashboards, in seats or in steering wheels of vehicles. In such circumstances, the airbag cushions of these airbag assemblies inflate toward an occupant of the vehicle from the dashboard, seat or steering wheel. When the occupant contacts the airbag cushion, the airbag cushion is compressed between the occupant and the dashboard, seat or steering wheel to absorb energy. In roof-mounted or overhead airbag assemblies, the airbag cushion often inflates downward toward the occupant from the roof or overhead structure in the vehicle.

Airbags are typically hidden from view by vehicle interior trim panels, such as A pillar covers or head liners. The utilization of trim to cover airbag deployment panels serves a multitude of purposes beyond mere aesthetics. Firstly, the trim can act as a sacrificial layer, channeling the explosive force of the airbag outward upon deployment. Secondly, the trim panel can be engineered to fragment in a predictable manner, preventing large and small pieces of trim from becoming projectiles within the vehicle cabin. Additionally, the trim can incorporate design features that guide the deployment path of the airbag, ensuring optimal occupant protection. Moreover, the trim conceals the airbag assembly, enhancing the interior design and preventing inadvertent tampering with a critical safety system. When properly configured, the airbag trim serves a vital function in ensuring the safe and controlled deployment of airbags, thereby maximizing occupant protection in the event of a collision.

The interior trim components of a motor vehicle are typically secured to the vehicle body using a combination of mechanical fasteners and adhesives. These fasteners can include plastic clips, push-pins, screws, and threaded inserts. During airbag deployment, the rapid inflation of the bag can exert significant pressure on the trim components, causing t to detach from their fastenings. This detachment may create projectiles within the vehicle cabin that could potentially injure occupants. In addition, fasteners that do not release as expected can delay or distort airbag deployment, thereby increasing the chances of occupant injury during a deployment event.

Figure 1:
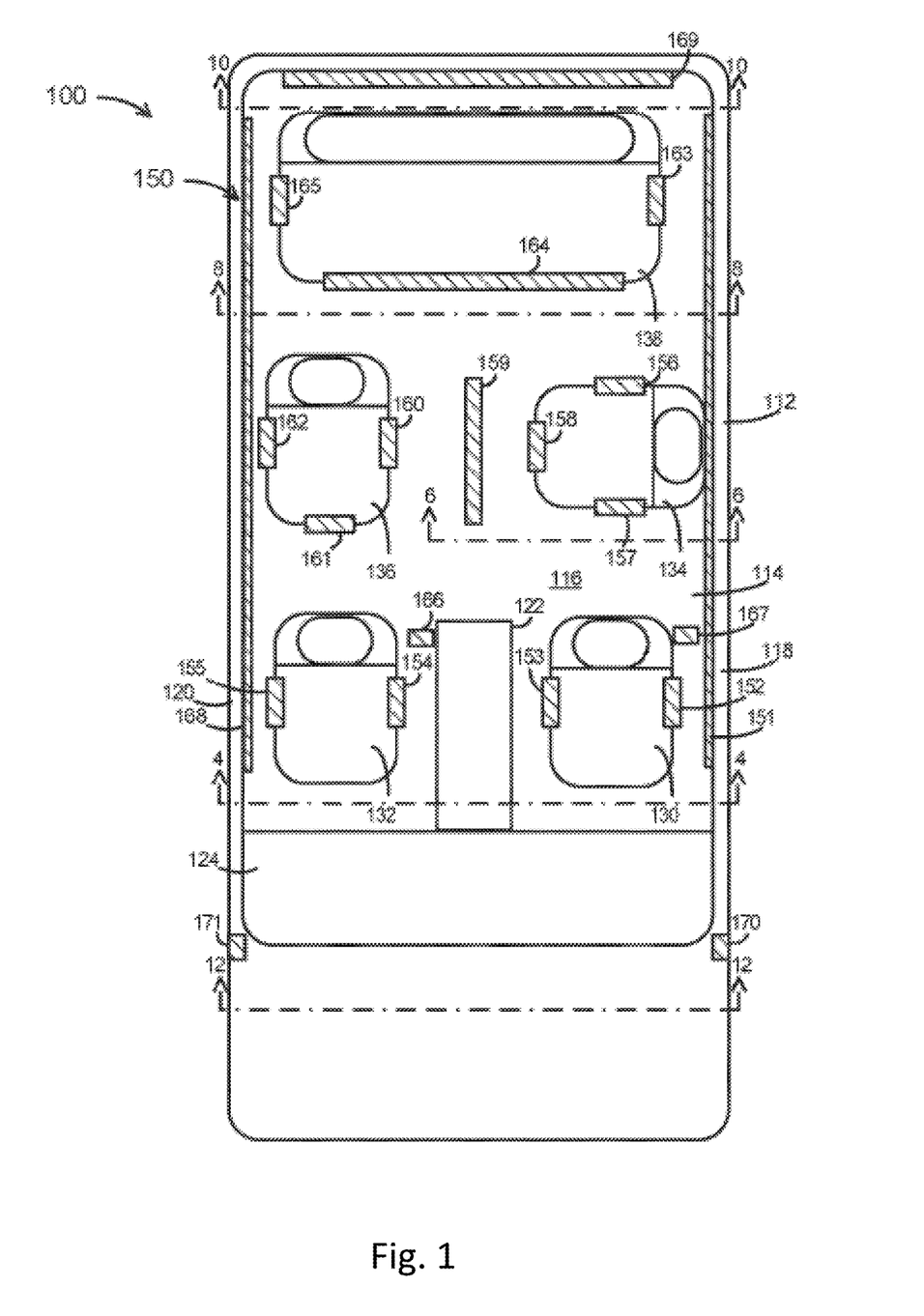
FIG. 1 shows a schematic representation of an airbag system implemented in a vehicle in accordance with an exemplary embodiment of the present disclosure.

Turning now to FIG. 1, a schematic representation of an airbag system 150 implemented in a vehicle 100 in accordance with an exemplary embodiment. The vehicle 100 is depicted in the illustrated embodiment as a passenger car, but it should be appreciated that any other vehicle, including trucks, sport utility vehicles (SUVs), recreational vehicles (RVs), marine vessels, aircraft, etc., can also be used. In one embodiment, the vehicle 100 is an autonomous vehicle that is automatically controlled to carry passengers from one location to another, although the vehicle 100 may also be a manually operated vehicle As depicted in FIG. 1, the vehicle 100 generally includes various structural elements that make up a body or frame 112 arranged on a chassis (not shown) to substantially enclose the components of the vehicle 100. Although not shown, the vehicle 100 generally includes a propulsion system, a transmission system, a steering system, and a brake system, as well as data storage devices, vehicle controller, and communication system. Operation of these components is generally understood and will not be discussed in greater detail.

Typically, the body 112 encloses a cabin 114 and may include elements such as a floor 116, doors (e.g., doors 118, 120), windows (not shown), windshield (not shown), center console 122, dashboard 124, roof (not shown), and other elements typical of a vehicle 100. One or more seats 130, 132, 134, 136, 138 are positioned within the cabin 114 to support the driver and/or passengers. Any seating arrangement may be provided. However, in the depicted embodiment, the vehicle 100 includes a front driver seat 130, a front passenger seat 132, left and right middle seats 134, 136, and a rear bench seat 138. Generally, seats 130, 132, 136, 138 have forward-facing orientations. However, other seat orientations may be provided, as demonstrated by the side-facing orientation of seat 134 or angled seat orientations (not shown). As also depicted in FIG. 1, the center console 122 may positioned between the front driver and passenger seats 130, 132. Additional structural and function details about the vehicle 100 may be introduced below.

The vehicle 100 additionally includes the airbag system 150 formed by one or more airbag modules 151-171 placed throughout the vehicle 100. The particular locations of the airbag modules 151-171 may vary and the arrangement in FIG. 1 is presented merely as one example. Generally, the airbag modules 151-171 function to protect the occupants, cargo, and/or pedestrians by activating an airbag cushion from a collapsed or stowed state into a deployed state.

In the depicted embodiment, the airbag system 150 includes a driver-side roof rail (or curtain) airbag module 151, a driver-side outboard airbag module 152, and a driver-side inboard airbag module 153 associated with the front driver seat 130. The airbag system 150 further includes a passenger-side inboard airbag module 154 and a passenger-side outboard airbag module 155 associated with the front passenger seat 132.

The airbag system 150 further includes left, right, and front edge airbag modules 156, 157, 158 associated with the left middle seat 134. The airbag system 150 also includes a center open-area airbag module 159 in between the left and right middle seats 132, 134. The airbag system 150 further includes left, right, and front edge airbag modules 160, 161, 162 associated with the right middle seat 136. The airbag system 150 also includes left, right, and front edge airbag modules 163, 164, 165 associated with the bench seat 138. The airbag system 150 also includes roof-mounted passenger and driver side airbag modules 166, 168 and a rear window airbag module 169. Finally, in the depicted embodiment, the airbag system 150 also includes exterior airbag modules 171, 172 mounted on the A-pillars of the vehicle 100. Generally, the configuration of FIG. 1 is merely an example, and one or more of the modules 151-171 may be omitted and/or additional modules may be added. Additional airbag modules may be introduced below.

As is generally understood, each seat (e.g., seat 130, 132, 134, 136, 138) includes a horizontal lower portion or seat bottom and an upper portion or seat back that extends upward from the rear end of the seat bottom. The seat bottom may be coupled to the vehicle 100 with a mounting system that allows the vehicle seat to be moved (e.g., fore/aft, lateral, up/down, etc.). Each of the seat bottom and the seat back includes a supporting frame. A cushion, such as a foam pad, may be coupled to the frame and a trim cover may surround the cushion.

As noted above, the seats 130, 132, 134, 136, 138 may be configured to include airbag modules (e.g., modules 151-171) within the seat back and/or bottom, such as within and/or under the cushion and trim cover. The airbag modules may be coupled directly to the seat frame with a mounting device, such as a mounting bracket, fastener, or plate. As also noted above, the modules 200 may be mounted on other portions of the body 112, such as the roof 126, floor 116, and/or exterior. As conditions warrant, the airbag cushion of the module 200 inflates and is driven away from the respective mounting location to limit the lateral, forward, or rearward movement of the occupant. Additional examples are provided below.

Figure 2:
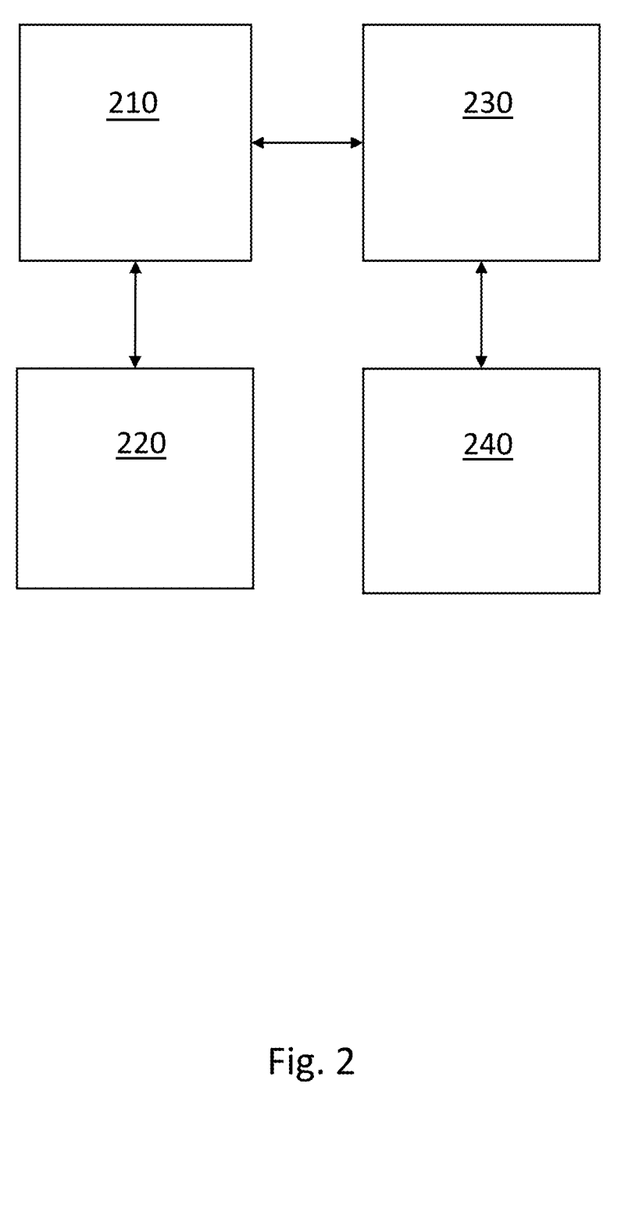
FIG. 2 is illustrative of a block diagram illustrating an exemplary implementation of an airbag module for providing vehicle occupant restraint in a motor vehicle according to an exemplary embodiment of the present disclosure.

Reference is briefly made to a schematic functional block diagram of an airbag module of the airbag system 150 of FIG. 1 in accordance with an exemplary embodiment. Generally, the airbag module 200 may represent any of the airbag modules discussed herein, including airbag modules 151-171 discussed above.

Turning now to FIG. 2, a block diagram illustrating an exemplary implementation of an airbag module 200 for providing vehicle occupant restraint in a motor vehicle is shown. The airbag module 200 may be considered to include a controller 210, one or more sensors 220, an inflator 230, and an airbag cushion 240 coupled together in any suitable manner. Generally, each airbag module 200 is configured to sense environmental conditions for the vehicle 100, identify one or more events for the vehicle 100 for which the airbag module 200 is configured to accommodate based on the sensed environmental conditions, and in response to the identified one or more events, selectively actuate the airbag module 200. The airbag module 200 may be mounted in any appropriate location, including the locations discussed above.

In some embodiments, various aspects of the airbag module 200 may be positioned at different locations. For example, the controller 210 and sensors 220 may be arranged in a different location than the inflator 230 and airbag cushion 240. Moreover, multiple airbag modules 200 may share resources. In other words, a controller 210 may operate numerous airbag modules 200, and/or sensors 220 may provide data to numerous airbag modules 200. Further, an inflator 230 may be used to inflate multiple airbag cushions 240.

Generally, the controller 210 may be one or multiple computers including a random access memory (RAM), a read-only memory (ROM) and a processing unit in addition to various input and output connections. The control functions of the controller 210 described herein may be implemented by one or more software programs stored in internal or external memory and are performed by execution by the processing unit. However, some or all of the functions may also be implemented by hardware components. It will be understood that the controller 210 may be implemented as a dedicated controller for controlling a particular airbag module 200, and optionally other airbag modules, or the controller 210 can be embodied in other controllers of the vehicle 100.

As one example and as introduced above, the controller 210 is communicatively coupled to monitor data collected by the sensors 220 associated with environmental conditions. In particular, the controller 210 is configured to identify one or more events for the vehicle 100 for which the airbag module 200 is configured to accommodate based on the environmental conditions for the vehicle 100. The sensors 220 may include pressure sensors configured to sense the application of pressure to the exterior of the vehicle 100.

Such pressure sensors 220 may be located in areas of the vehicle body 112, including the front door 118, the rear door 120, and/or in other portions of the vehicle body 112, such as the A-pillar, the B-pillar, or the C-pillar. Additionally, the sensors 220 may include accelerometers or other sensors configured to sense transverse acceleration of the vehicle 100. Further, the sensors 220 may include a gyro sensor or other sensor configured to sense rotation of the vehicle 100 about its longitudinal axis. In some embodiments, the controller 210 may receive signals from other sources, such as other vehicle systems or sensors outside of the module 200.

In one exemplary embodiment, the sensors 220 may collect additional information, including information about the occupant. For example, the sensors 220 may include weight or pressure sensors that detect the presence of an occupant in the seat, thereby enabling actuation of the airbag module when an occupant is present and preventing actuation of the airbag module with there is no occupant. As another example, the sensors 220 may include pressure, proximity, or other type of sensors that determine the orientation and/or position of the occupant in the seat (e.g., the size of the occupant, which way the occupant is facing, head position of the occupant relative to body structures, and/or whether the occupant is sitting upright or lying down). This information may be useful to determine which airbag module (or modules) 200 to activate.

Upon detection of an event, the controller 210 generates a command signal for the inflator 230. In response, the inflator 230 provides gas or air to the airbag cushion 240. Generally, airbag cushion 240 is an inflatable structure that is initially in a stowed or collapsed state. In the stowed state, the airbag cushion 240 of the airbag module 200 may be hidden from view within the interior of the vehicle 100. The airbag cushion 240 may be folded, rolled, or otherwise compressed into the stowed state prior to deployment.

Upon being inflated by the air from the inflator 230, the airbag cushion 240 is inflated into the deployed state. Specifically, the airbag cushion 240 has one or more internal inflatable chambers which are inflated by the selective rapid introduction of inflation gas. The inflation causes any covering to be displaced, thereby exposing the cushion 240 to the cabin 114 of the vehicle 100.

Figure 3:
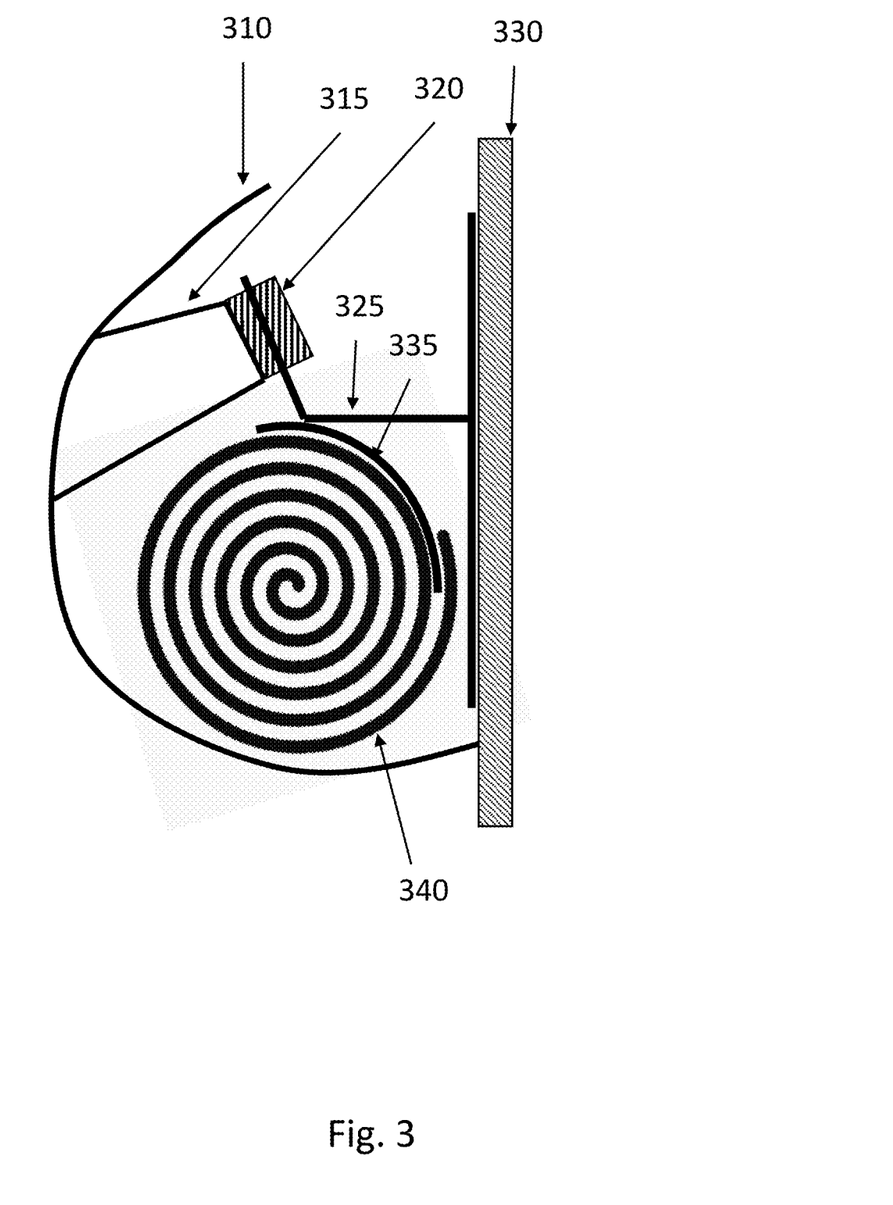
FIG. 3 shows a diagram illustrating a cross sectional view of an exemplary active safety system including a roof rail airbag having a pillar pusher chamber in a motor vehicle in accordance with embodiments of the present disclosure.

Turning now to FIG. 3, a diagram illustrating a cross sectional view of an exemplary active safety system 300 including a roof rail airbag 340 having a pillar pusher chamber 335 in accordance with embodiments of the present disclosure is shown. During vehicle assembly airbags are typically affixed to interior vehicle cabin surfaces before interior trim pieces are installed. The exemplary roof rail airbag 335 is shown in a rolled, pre-deployment configuration. Once the airbag 340 is installed, pillar trim 310 can be affixed to a vehicle body panel 330 using a trim support 315 and a trim clip 320 to conceal the airbag 340. The trim clip 320 is mechanically coupled to a trim support 315 which is formed as part of, or mechanically coupled to, an interior surface of the pillar trim 310. The trim support 315 can be rigid or pliable depending on the design requirements. A header extension 325 is rigidly affixed to an interior surface of the vehicle body panel. During vehicle assembly, the trim clip 320 is clipped to the header extension 325 to support and restrain the pillar trim 310 after installation of the airbag 340. In some exemplary embodiments, the header extension 325 can act as a reactionary surface for the airbag 340.

Figure 4:
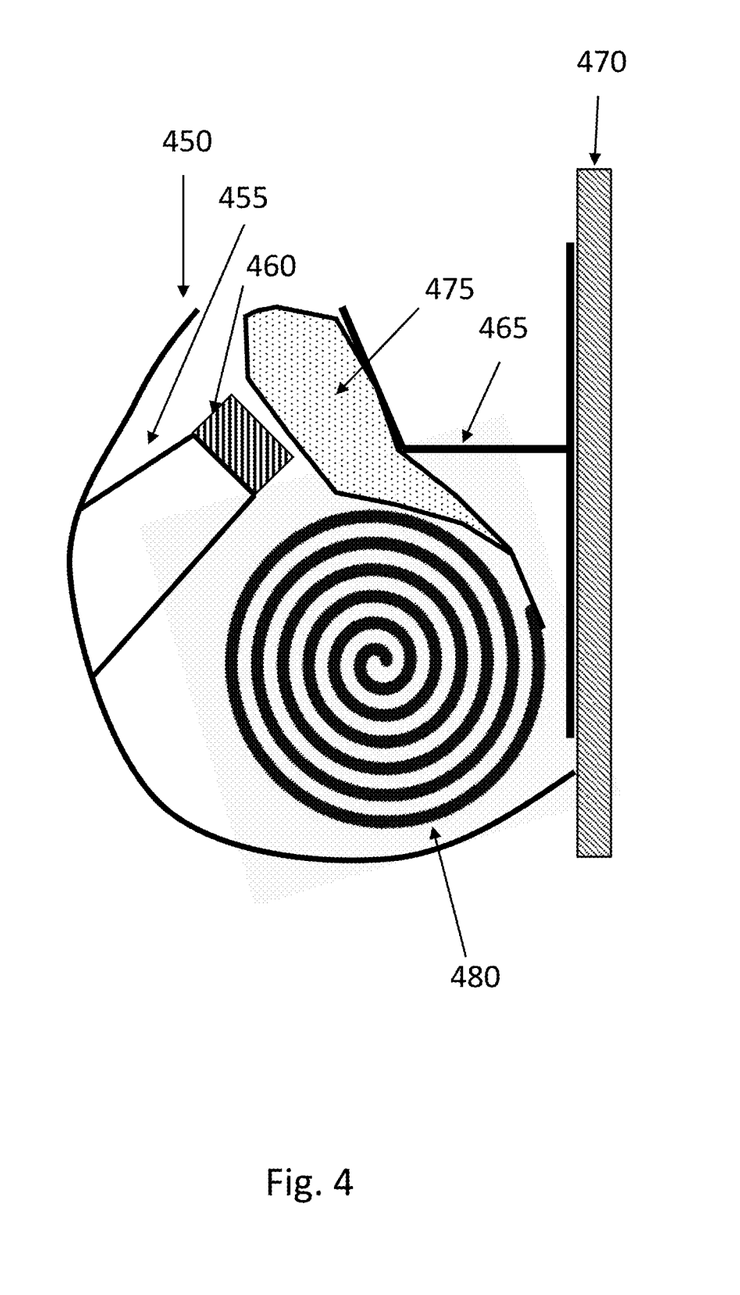
FIG. 4 shows a cross sectional view of an exemplary active safety system illustrative of a partial deployment of a roof rail airbag having a pillar pusher chamber.

Turning now to FIG. 4, a cross sectional view of an exemplary active safety system 400 illustrative of a partial deployment of a roof rail airbag 480 having a pillar pusher chamber 475 in accordance with embodiments of the present disclosure is shown. In some exemplary embodiments, deployment of the roof rail airbag 480 initially pressurizes the pillar pusher chamber 475. The inflating pillar pusher chamber 475 asserts a pressure on the trim clip 460 in such a way that the trim clip 460 is disengaged from the header extension 465 without breaking the trim clip 460, or fracturing the trim clip 460 in a predicted, desired manner. For example, for a push type edge clip can be inserted in an installation direction over a header extension 465 for providing support restraint to the pillar trim in a direction orthogonal to the surface of the header extension 465 and the installation direction. When the roof rail airbag 480 is deployed, the pillar pusher chamber 475 exerts a force on the push type edge clip opposite to the installation direction thereby disengaging the clip from the header extension 465 before the airbag applies a force on the pillar trim 450 orthogonal to the surface of the header extension 465. In some exemplary embodiments, the trim clip 460 stays rigidly affixed to the pillar trim 450 via the trim support 455. After initial deployment of the pillar pusher chamber 475, the remaining portions of the roof rail airbag 480 fully deploy supported by the vehicle body panel 470. In some exemplary embodiments, the pillar trim 450 can be configured with additional tabs and/or clips to initially restrain the pillar trim 450 during airbag deployment such that the pillar trim is ejected away from vehicle occupants during airbag deployment.

Figure 5:
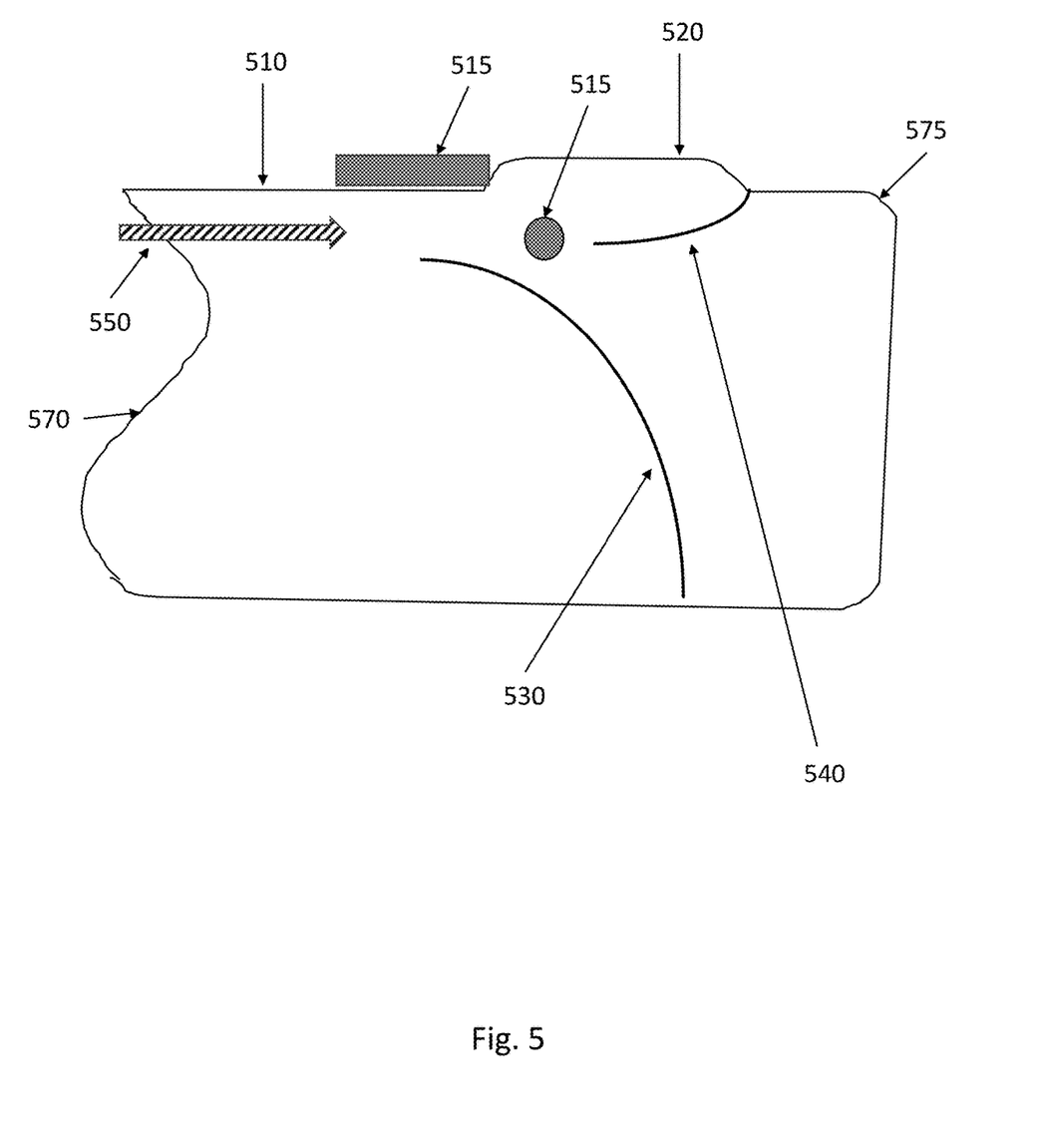
FIG. 5 shows an illustration of exemplary airbag assembly with a pusher chamber in a vehicle in accordance with the present disclosure.

Turning now to FIG. 5, an illustration of exemplary airbag assembly 500 with a pusher chamber 520 in a vehicle in accordance with the present disclosure is shown. The exemplary airbag assembly 500 can include an airbag cushion 510, a pusher chamber 520, a first seam 530, and a second seam 540. According to exemplary embodiments, the airbag cushion 510 can be a roof rail airbag cushion. For a roof rail airbag configuration, the airbag assembly 500 can be positioned along one or more interior trim pillars and the roofline of the passenger compartment. The airbag assembly 500, in its undeployed state, can be secured by a plurality of clips and tethers at its upper edge to attachment points on the interior structure of the vehicle, such as the roof bow or pillar trim. The tethers may include straps, wires, or other suitable restraining elements. The clips and tethers function to retain the airbag assembly 500 within its housing prior to deployment while allowing for controlled deployment along a predetermined path during a side impact collision event.

In some exemplary embodiments, a pusher chamber 520 is integrated into the airbag cushion 510 in order to disengage one or more of the restraining elements, such as clips and/or tethers, during an airbag assembly deployment, thereby preventing trim breakage and reducing the occurrence of trim fragments being ejected toward a vehicle occupant. In addition, disengage of one or more of the restraining elements by the pusher chamber 520 prevents delayed deployment of the airbag assembly 500. For example, during deployment the inflator gas flow 550 is directed in such a way that the gas first flows into the pusher chamber 520. As a result, the pusher chamber 520 pushes the airbag cushion 510 inward to disengage the trim restraining element.

For example, in a roof rail airbag application, when the airbag assembly 500 is deployed, gas from the airbag assembly inflator is first directed to fill the pusher chamber 520 between headliner and A-pillar trim. As a result, the A-pillar trim is disengaged without breaking by the force of the inflator gas filling the pusher chamber 520. In some exemplary embodiments, the pusher chamber 520 can be sized to have a height that reaches from the airbag cushion 510 to a top of the inner panel and a width that spans from the A pillar trim doghouse to the header extension 515 such that enough force is generated to disengage the A pillar trim. In some exemplary embodiments, an inactive button 515 on the airbag cushion 510 can divide the inflator gas flow 550 between the main chamber of the airbag cushion and the pusher chamber 520. The button 515 can further be used as a space to sew a mini-tab for an affixing bolt. The button 515 can further be configured as a restraint to the pusher chamber 520.

In some exemplary embodiments, seams 530, 540 can be employed to direct inflator gas flow 550 such that the pusher chamber 520 is fully inflated before the rest of the airbag cushion is inflated. These seams 530, 540, particularly those with strategically placed tear points, can influence how the airbag expands. These tears allow for localized expansion in specific areas, such as the pusher chamber 520 helping the airbag better conform to the occupant's body shape for optimal protection. For example, a first seam 530 can be stitched within the airbag cushion 510 such that inflator gas flow 550 received at a proximate edge 570 of the airbag cushion 510 is directed initially towards a distal edge 575 of the airbag cushion. A portion of this redirected inflator gas flow 550 can then be directed into the pusher chamber 520 by the second seam 540. In some exemplary embodiments, these seams 530, 540 can be tear away seams that disengage when the airbag cushion 510 nears complete inflation.

Figure 6:
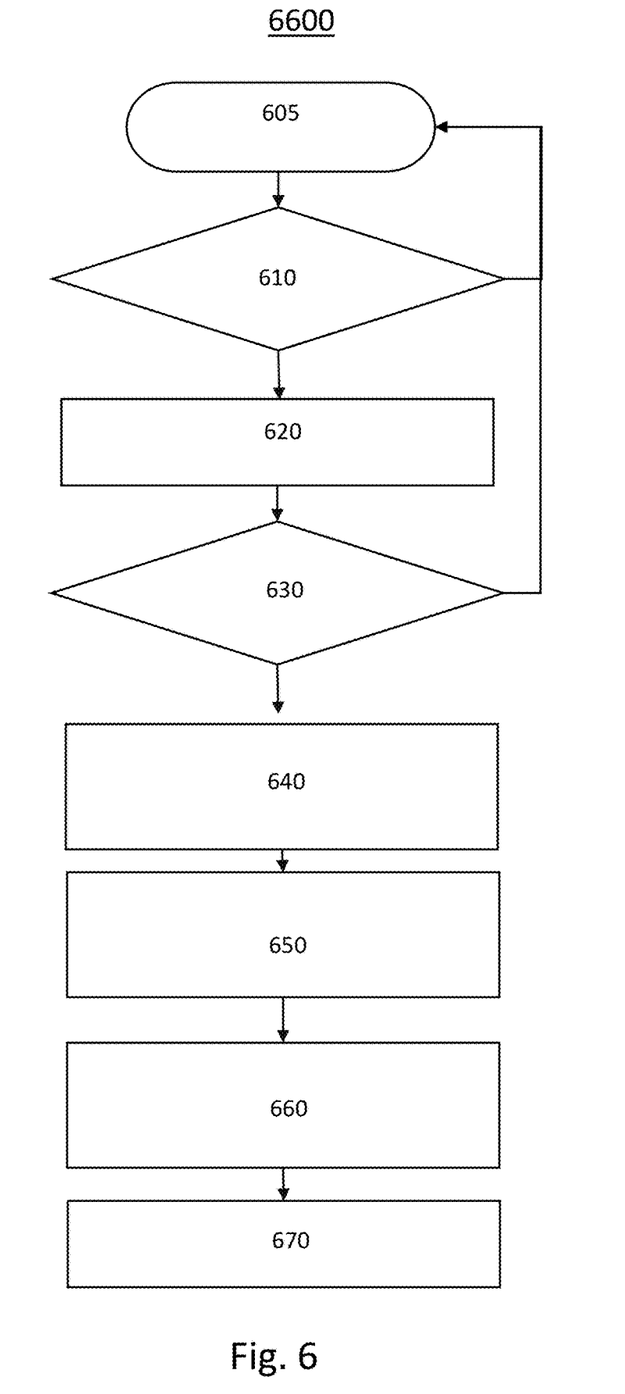
FIG. 6 shows a flow chart illustrating an exemplary implementation of a method for implementing an active airbag assembly including a pusher chamber in accordance with the present disclosure.

Turning now to FIG. 6, a flow chart illustrating an exemplary method 400 for implementing an active airbag assembly including a pusher chamber in accordance with the present disclosure is shown. The method 600 is first operative to monitor 605 for an impact event. The impact event is a high impact force experienced by the vehicle detected in response to signals generated by airbag sensors in the vehicle. The airbag sensors can include accelerometers which employ use microelectromechanical systems (MEMS) technology or internal masses. During a high impact force event, the rapid deceleration forces the mass to move against internal springs or alters the electrical field within the sensor. This change triggers a signal indicating a potential collision. Alternatively G-force sensors can be employed as airbag sensors. G-force sensors can be specialized accelerometers designed to detect high-g forces associated with a high impact event. G-force sensors can be tuned to a specific range of accelerations relevant to airbag deployment. If no impact event is detected 610, the method 600 returns to monitoring 605 for the impact event.

If an impact event is detected 610, the method 600 is next operative to analyze 620 the airbag sensor signals to determine if the airbag should be triggered. This analysis can include magnitude of the acceleration, such as if the airbag sensors detects a sudden and significant deceleration exceeding a predetermined threshold during a collision. In some exemplary embodiments, the electronic control unit (ECU) for the active safety system can receive signals from multiple airbag sensors, such as signals from sensors from different locations in the vehicle. The ECU then analyzes the data from each of the sensors and can consider factors like the severity of the impact, location of impact, and whether seatbelts are fastened. Based on the sensor data and programmed algorithms, the ECU determines if the sensor data exceeds a triggering threshold 630 in order to decide whether to deploy the airbags and which airbags to deploy. If the sensor data does not exceed the triggering threshold, the method returns to monitoring 605. If the sensor data does exceed the triggering threshold for deployment, the ECU sends 640 an electrical signal to the airbag inflator to trigger inflation. In some exemplary embodiments, the inflation includes a rapid chemical reaction that generates hot nitrogen gas to inflate the airbag cushion at high speed, providing a cushion for the occupant.

In response to triggering the inflator, the method 600 initially directs 650 the inflator gas towards the pusher chamber integrated within the airbag cushion. Inflation of the pusher chamber acts to disengage the airbag restraint element, such as a clip or tether. The pusher chamber and airbag restraint element are configured such that inflation of the pusher chamber disengages the restraint element without breaking the restraint element. Disengaging the intact restraint element avoids fragments of the restraint element and/or fragments of a trim piece, such as an A-pillar trim, being ejected towards a vehicle occupant.

After inflation of the pusher chamber, the method 600 is next configured to direct 660 the inflator gas towards the remainder of the airbag cushion. In some exemplary embodiments, the inflator gas can be redirected resulting from a pressurization of the pusher chamber. For example, when the pusher chamber pressure reaches a certain pressure, the inflator starts flowing towards the lower pressure airbag cushion cavity as a result of the pressure differential. In another exemplary embodiments, the pressure chamber can include a flap or valve with cuts of the inlet of the pusher camber from the inflator gas once the pusher chamber pressure exceeds a predetermined pressure threshold. After deployment of one or more airbags, the ECU can generate 670 a data signal indicative of the airbag deployment event and couple this data signal to over vehicle controllers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An active vehicle restraint system comprising:
   a sensor for generating a sensor control signal in response to an acceleration;
   an airbag inflator configured to expel an inflator gas in response to an airbag trigger control signal;
   an airbag cushion having a pusher chamber wherein the airbag cushion is configured such that the inflator gas is directed towards the pusher chamber such that the pusher chamber is pressurized before a remainder of an airbag cushion chamber;
   a vehicle trim piece affixed to a vehicle body with a retention element such that the vehicle trim piece covers a portion of the airbag cushion, wherein the retention element is configured such that the retention element is detached from the vehicle body by the pusher chamber and wherein the retention element maintains a structural integrity during a detachment process from the vehicle body; and
   an electronic control unit for generating the airbag trigger control signal in response to the sensor control signal.

2. The active vehicle restraint system of claim 1 wherein the pusher chamber is a portion of the airbag cushion chamber.

3. The active vehicle restraint system of claim 1 wherein the inflator gas is directed towards the pusher chamber by at least one seam within the airbag cushion.

4. The active vehicle restraint system of claim 1 wherein the inflator gas is directed towards the pusher chamber by a circular button sewn into the airbag cushion and wherein the circular button is further configured to accept a bolt for securing the airbag cushion to the vehicle body.

5. The active vehicle restraint system of claim 1 wherein the airbag cushion is a roof rail airbag cushion and the vehicle trim piece is a pillar trim piece.

6. The active vehicle restraint system of claim 1 wherein the retention element is a press fit clip pressed over an edge of a mounting tab rigidly affixed to the vehicle body within a vehicle cabin.

7. The active vehicle restraint system of claim 1 wherein the airbag cushion is a roof rail airbag.

8. The active vehicle restraint system of claim 1 wherein the vehicle trim piece is a pillar trim piece and wherein the retention element is a detachable c-clip engaged on a tab rigidly affixed to the vehicle body.

9. The active vehicle restraint system of claim 1 wherein the retention element is a spade type clip inserted first through a grommet in the pusher chamber and then through a hole in a tab rigidly affixed to the vehicle body.

10. A method of implementing an active vehicle restraint system comprising:
    generating, by an electronic control unit, an airbag trigger control signal in response to receiving a sensor signal indicative of an acceleration of a vehicle body exceeding a threshold acceleration;
    expelling an inflator gas by an airbag inflator into an airbag cushion in response to the airbag trigger control signal; and
    directing the inflator gas to a pusher chamber integrated within the airbag cushion such that the pusher chamber is pressurized before a remainder of the airbag cushion and wherein a pressurization of the pusher chamber causes a retention element of a vehicle trim piece to be detached from the vehicle body by the pusher chamber and wherein the retention element maintains a structural integrity during a detachment process from the vehicle body.

11. The method of implementing the active vehicle restraint system of claim 10 wherein the pusher chamber forms a portion of an airbag cushion chamber.

12. The method of implementing the active vehicle restraint system of claim 10 wherein the inflator gas is directed towards the pusher chamber by a seam sewn into the airbag cushion.

13. The method of implementing the active vehicle restraint system of claim 10 wherein the inflator gas is directed towards the pusher chamber by a circular button sewn into the airbag cushion and wherein the circular button is further configured to accept a retention bolt to be secured within a threaded hole rigidly affixed to the vehicle body.

14. The method of implementing the active vehicle restraint system of claim 10 wherein the airbag cushion is a roof rail cushion and the vehicle trim piece is a pillar trim piece.

15. The method of implementing the active vehicle restraint system of claim 10 wherein the retention element is a detachable c-clip engaged on a tab welded to the vehicle body.

16. The method of implementing the active vehicle restraint system of claim 10 wherein the retention element is a press fit clip pressed over an edge of a mounting tab rigidly affixed to the vehicle body within a vehicle cabin.

17. The method of implementing the active vehicle restraint system of claim 10 wherein the airbag cushion is a side curtain airbag and the vehicle trim piece is a roof rail trim piece.

18. The method of implementing the active vehicle restraint system of claim 10 wherein the retention element is a spade type clip inserted first through a grommet in the pusher chamber and then through a hole in a tab rigidly affixed to the vehicle body.

19. An airbag cushion comprising:
    an inlet for receiving a compressed gas from an airbag inflator, wherein the airbag inflator is triggered in response to an acceleration exceeding a threshold acceleration;
    a pusher chamber configured such that the compressed gas is initially directed towards the pusher chamber such that the pusher chamber is pressurized before a remainder of the airbag cushion and wherein the pusher chamber is configured to disengage an interior trim piece retention element from a vehicle body frame member when the pusher chamber is pressurized such that the interior trim piece retention element maintains a structural integrity during a detachment process from a vehicle body.

20. The airbag cushion of claim 19 wherein the airbag cushion further includes at least one of a seam and a button sewn into the airbag cushion to direct the compressed gas from the inlet to the pusher chamber such that the pusher chamber is pressurized before the remainder of the airbag cushion.

\* \* \* \* \*